D. L. LINDQUIST.
MOTOR CONTROL.
APPLICATION FILED MAY 7, 1908.
980,109.
Patented Dec. 27, 1910.
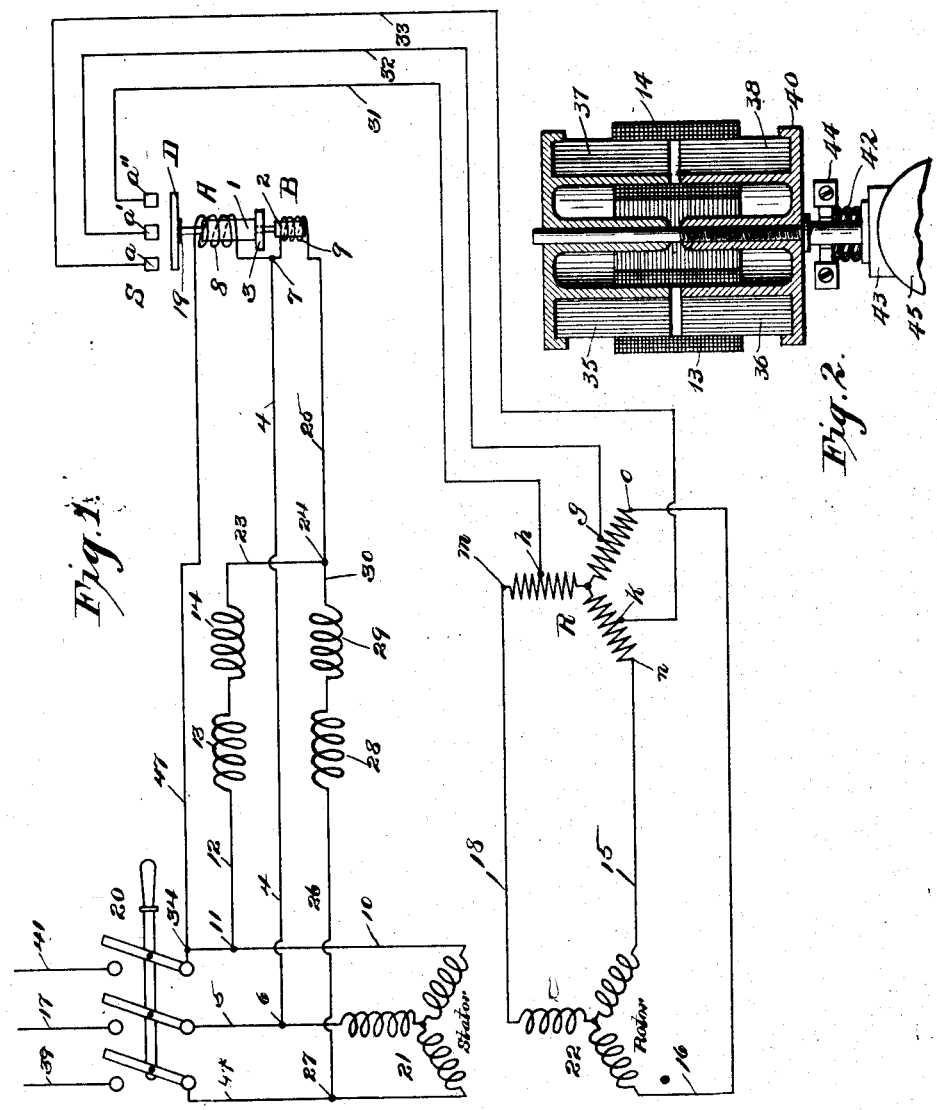

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

MOTOR CONTROL.

980,109.     Specification of Letters Patent.     Patented Dec. 27, 1910.

Application filed May 7, 1908. Serial No. 431,498.

*To all whom it may concern:*

Be it known that I, DAVID L. LINDQUIST, a subject of the King of Sweden, residing at Yonkers, in the county of Westchester and State of New York, have invented a new and useful Improvement in Motor Control, of which the following is a specification.

My invention relates to means for controlling electric motors of the alternating current type, which are adapted to be operated by single-phase currents or polyphase currents.

One of the objects of my invention is the provision of a simple and efficient alternating current brake in combination with an alternating current motor starting device.

More particularly it is the object of the present invention to provide a brake for an alternating current motor in connection with an alternating current motor starting device to permit said brake to be operated with minimum consumption of current.

Other objects of my invention will appear hereinafter, the novel combinations of elements being pointed out in the claims.

My invention is shown diagrammatically in Figure 1 as applied to a three phase induction motor, but my invention is also adaptable to two-phase motors and alternating current motors of other types. Fig. 2 shows a brake apparatus which is well adapted for use with my invention.

Referring to Fig. 1, 39, 17 and 41 designate the mains which are connected through the manual switch 20 by way of the leads 48, 5 and 10, respectively, to the terminals of the stator winding 21 of the induction motor. The secondary or rotor winding 22 has its terminals connected by the leads 18, 15 and 16, respectively, to the terminals $m$, $n$ and $o$ of the starting resistance R. This starting resistance may be star-connected, delta-connected, or varied as desired. Preferably it is divided into a number of sections so that it may be cut out gradually in a series of steps by means of electric switches successively operated in any well known manner. In this instance I have shown only two sections in each of the branches of the star-connected resistance R, and the wires 31, 32 and 33 connected respectively between the points $h$, $g$ and $k$, and the fixed contacts $a$, $a'$ and $a''$ of the electric switch S. For the sake of simplicity, I have shown but a single switch, but as indicated in my Patent No. 733,550, granted July 14, 1903, for an improvement in controlling devices for alternating current motors, there may be a plurality of such switches.

The means for operating the switch S comprises an operating electromagnet A and a holding electromagnet B. The cores of these electromagnets are designated 1 and 2, respectively, and are connected with each other so that they will move together. The upper core 1 is also connected with the bridge piece D from which it is insulated by means of the insulation 19. If desired, a suitable stop 3 may be employed for limiting the downward movement of the cores 1 and 2 and the bridge piece D, which, it is evident, all move together. The core 1 is so positioned with respect to its solenoid 8 that when the latter is energized, said core will be drawn upwardly; but the core 2 normally occupies such a position with respect to its solenoid 9 that the latter, when energized, will tend to hold the core 2 in its lowermost position. If desired, the electromagnets A and B may be combined in a single electromagnet having two windings disposed in opposition to each other. Such an arrangement, as well as a plurality of switches similar to the one herein shown, is disclosed in my co-pending application, Serial No. 262,528, filed May 26, 1905, for an improvement in controlling devices for alternating current motors.

The alternating current electromagnetic brake is shown diagrammatically by the windings 13 and 14 connected in series with each other and with the wires 12 and 23 between the lead 10 and the wire 25, being connected respectively to the same at the points 11 and 24. The windings 28 and 29 are also connected in series with each other, and the wires 26 and 30 between the lead 48 and wire 25, being connected to the same at the points 27 and $24_r$ respectively.

The magnet of the brake apparatus shown in Fig. 2 is similar to that disclosed in my Patent #744,773, granted November 24, 1903 for an improvement in electro-magnets. This apparatus comprises a plurality of armature cores such as 36 and 38 which are arranged in vertical alinement with co-acting fixed cores 35 and 37 but at a certain distance therefrom, said distance forming an air gap. The fixed cores such as 35 and 37 are provided with magnet windings 13, 14 which when energized by an electric current tend to reduce the air gap and thus raise the movable cores 36 and 38. These movable cores are connected to a member 40 which is secured to a brake shoe 43. A coil spring 42 bears against the brake shoe 43 and a fixed bracket 44 and tends to maintain the movable cores 36, 38 in their lowermost position with the shoe 43 in engagement with a brake pulley 45. I do not, however, wish to be limited to the construction of the electromagnet herein disclosed, as any other suitable alternating current electromagnet may be used if desired, so long as it accomplishes the object of my invention. Furthermore, an electromagnet operated by polyphase currents, as, for example, three-phase current, may be used if desired, and in such event the winding may be varied accordingly.

Referring again to Fig. 1, it should be noted that the winding 8 is connected between the lead 5 and the lead 10 by means of the conductors 4 and 47, whereas the winding 9 is connected between the points 24 and 7, so that the current received by the electromagnet B will be dependent upon the current flowing through the brake magnet coils. As soon as the main line switch 20 is closed, the lifting coil 8 of the short-circuiting magnet A is excited with current from a source of constant potential between the lead 5 at the point 6 and the lead 10 at the point 34. The lifting power of the electromagnet A is therefore substantially constant from the time that the main line switch 20 is closed to the time that the switch S is automatically closed and the motor has attained full speed.

The holding coil 9 being connected in series with the brake magnet, will receive maximum current when the switch 20 is first closed, and thus prevent the lifting coil 8 from moving upwardly the bridge piece D. As long as the armature of the brake magnet is in its lower position where the magnetic reluctance is high, due to the air gaps, the brake magnet will take the maximum amount of current, and the coil 9, being in series with said brake magnet, will also receive maximum current. In other words, so long as the brake magnet armature is down and the brake is still applied, the magnetic reluctance is high and the current through the brake magnet and through the holding magnet is consequently at its maximum. The current through the lifting coil 8 remains substantially constant and the means for operating the switch S is so designed that at this time the holding electromagnet B will overpower the lifting electromagnet A and prevent the latter from being effective in moving the bridge piece D into engagement with the fixed contacts $a$, $a'$ and $a''$. When, however, the brake magnet has lifted its armature and released the brake, the air gaps of the brake magnet are substantially eliminated, thus materially reducing the magnetic reluctance and increasing the self-induction to such an extent that the current through the brake coils, and consequently through the holding coil 9, will be decreased until the power of the electromagnet B is overcome by the lifting magnet A. When this occurs the bridge piece D will be moved upwardly to electrically connect the fixed contacts $a$, $a'$ and $a''$, thus short-circuiting or cutting out that portion of the starting resistance which is herein shown connected between the points $h$, $g$ and $k$.

It should be noted particularly that so long as the lifting coil 8 receives current, the pull of the same on its core 1 is substantially constant, provided the line voltage remains substantially constant. In case the line current is weak, so that the voltage drops upon the current being drawn from the line, the lifting magnet will, upon starting, have less pull, but at the same time the holding current will be less also in substantially the same proportion, so that the relation between the upward pull of the electromagnet A and the downward pull of the electromagnet B is nearly constant and almost independent of the line voltage.

The electromagnets A and B are single-phase electromagnets, and the lifting electromagnet may be connected across any two of the mains in a multiphase system; but it is preferably so connected as to effect a good balance.

An important feature of my invention and of the arrangement of the circuits and connections illustrated, is that at first starting there is a high resistance in the secondary or rotor circuit, which naturally decreases the current taken by the motor to such an extent that the sum of the current in the brake magnet in the down position and the minimum starting currents of the motor, will not exceed the sum of the currents in its up position and the maximum starting current of the motor. In other words, upon starting the motor by the closing of the main line switch 20, the stator will take minimum current by reason of the high resistance in the rotor circuit. At this time, however, the brake magnet and the holding magnet take maximum current. After the switch S has been operated to short-circuit a portion of the resistance R, more current will be received by the stator from the mains by reason of the reduction of the resistance of the rotor circuit. But when this occurs, the armature of the brake magnet will be in such a position as to very much lessen the reluctance of its magnetic circuit, and consequently increasing the self-induction in the brake magnet windings so that the same will take much less current from the mains. After the brake has been released, only a small amount of current is necessary to hold the brake apparatus in releasing position. The arrangement may be such that the brake magnet current at the start, added to the current taken by the motor at the same time, will be about equal to the sum of the current taken by the brake magnet and the current taken by the motor after the latter has attained full speed. Although I have herein shown only a single embodiment of my invention, I wish it to be understood that I do not desire to be limited to any particular construction or arrangement of parts in an actual device which could be constructed by those skilled in the art from the disclosure herein made.

Having fully described my invention, what I claim and desire to have protected by Letters Patent of the United States, is:—

1. The combination with an alternating current motor, of electro-magnetic brake apparatus for said motor, and means dependent upon the magnetic reluctance of said brake apparatus for controlling the speed of said motor.

2. The combination with an alternating current motor, of electro-magnetic brake apparatus therefor, and means dependent upon the reluctance of the circuit for said brake apparatus for controlling the speed of said motor, said means being independent of slight variations of voltage in the main line.

3. The combination with an electric motor, of brake apparatus therefor comprising a brake magnet, and a differential device dependent upon the operation of said brake magnet for controlling the speed of said motor.

4. The combination with an alternating current motor of the induction type, of brake apparatus comprising an alternating current magnet having a movable armature, and means dependent upon the magnetic reluctance of said magnet for controlling the speed of said motor.

5. The combination with an alternating current motor of the induction type, of brake apparatus therefor comprising an electromagnet, electromagnetic means for controlling the speed of said motor, said electromagnetic means being electrically connected to the brake magnet and controlled by the impedance of the electrical circuit of the latter and operating independently of slight variations of the primary voltage.

6. The combination with an alternating current motor of the induction type, of brake apparatus therefor, and means controlled by the magnetic reluctance of the brake apparatus for controlling the speed of said motor.

7. The combination with an alternating current motor, of supply mains therefor, starting resistance for said motor, means for varying the said starting resistance, a brake magnet, and connections for said brake magnet to effect the operation of said resistance-varying means by the variation in the impedance of the brake circuit after the brake has been operated.

8. The combination with an alternating current motor, of an electromagnet for operating a brake, and means comprising opposing electromagnets dependent upon the operation of said brake magnet for controlling the speed of said motor.

9. The combination with an alternating current motor, of a brake magnet therefor, and a speed-controlling device comprising opposing electromagnets, one of said electromagnets being connected to depend for its operation upon said brake magnet.

10. The combination with an alternating current induction motor, of a brake magnet therefor, and an electromagnetic controlling device comprising opposing electromagnets operated independently of the secondary circuit.

11. The combination with an alternating current induction motor, of a speed-controlling device for said motor comprising opposing electromagnets, and a brake magnet connected to effect the variation in the strength of one of said electromagnets.

12. The combination with an alternating current motor, of main lines connected thereto from a source of alternating current, of an electromagnetic starting device for the motor comprising opposing electromagnets, a brake electromagnet, and connections for effecting the energization of one of said opposing electromagnets by the main line voltage, and for varying the current through the other opposing electromagnet of said starting device in accordance with the variations of current in said brake electromagnet.

13. The combination with a multiphase motor of the induction type, of supply mains therefor, an electro-receptive device connected across two of said mains, a variable resistance in the secondary of said motor, a brake magnet of the alternating current type, an additional electro-receptive device connected between said brake magnet and one of the supply mains, and means operated by said first-named electro-receptive device in opposition to said additional electro-receptive device for short-circuiting or cutting out said variable resistance to effect an increase of speed of the motor.

14. The combination with an induction motor, of supply mains therefor, a starting resistance for said motor, a switch for cutting out said starting resistance to effect an increase of speed of the motor, a lifting electromagnet connected across two of the mains for operating said switch, a brake magnet connected across the mains, and a holding electromagnet connected between said brake and one of the mains, said holding electromagnet acting in opposition to the lifting electromagnet to prevent the latter from operating the switch until after the brake magnet has operated and the current in itself and in the holding electromagnet has been reduced.

15. The combination with a three-phase induction motor, of sectional starting resistance therefor, a switch for short-circuiting or cutting out said starting resistance, a lifting electromagnet connected across any two of the mains of said motor and tending to close said switch, a two-phase or polyphase brake electromagnet connected across the mains, and a holding electromagnet connected between one of the mains and said brake electromagnet to be dependent upon the current in the latter and acting in opposition to said lifting electromagnet to prevent the same from closing the switch until after the brake magnet has been operated to release the brake.

In testimony whereof, I have signed my name to this specification in the presence of two subscribing witnesses.

DAVID L. LINDQUIST.

Witnesses:
 CHAS. M. NISSEN,
 JAMES D. IVERS.